(12) United States Patent
Masuda et al.

(10) Patent No.: US 6,280,208 B1
(45) Date of Patent: Aug. 28, 2001

(54) SHIELD CONNECTOR STRUCTURE

(75) Inventors: Satoki Masuda; Shigemi Hashizawa; Kazuhisa Ishizaki, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/542,275

(22) Filed: Apr. 4, 2000

(30) Foreign Application Priority Data

Apr. 7, 1999 (JP) .................................................. 11-099939

(51) Int. Cl.$^7$ ....................................................... H01R 4/58
(52) U.S. Cl. ............................ 439/98; 439/548; 439/556; 439/559; 439/587; 174/65 R
(58) Field of Search ............................ 439/98, 587, 548, 439/556, 559; 174/65 R

(56) References Cited

U.S. PATENT DOCUMENTS

| 3,982,813 | * | 9/1976 | Cope et al. ........................ 337/127 R |
| 4,867,692 | | 9/1989 | Kerek .................................... 439/151 |
| 5,691,506 | | 11/1997 | Miyazaki et al. .................... 174/65 R |
| 6,042,396 | * | 3/2000 | Endo et al. ............................ 439/98 |
| 6,053,749 | * | 4/2000 | Masuda et al. ........................ 439/98 |
| 6,137,056 | * | 10/2000 | Miyazaki ............................... 174/78 |

FOREIGN PATENT DOCUMENTS

| 197 43 710 A1 | 5/1998 | (DE) . |
| 198 22 015 A1 | 11/1998 | (DE) . |
| 198 48 343 A1 | 4/1999 | (DE) . |
| 0 704 940 A2 | 4/1996 | (EP) . |
| 5-251116 | 9/1993 | (JP) ................................. H01R/9/05 |

OTHER PUBLICATIONS

German Office Action of Apr. 3, 2001 with English translation, Application No. 100 16 943.0–34.

* cited by examiner

*Primary Examiner*—Paula Bradley
*Assistant Examiner*—Ann McCamey
(74) *Attorney, Agent, or Firm*—Sughrue, Mion, Zinn, Macpeak & Seas, PLLC

(57) ABSTRACT

A shield member is closely contacted with a first seal member 3 projecting in the axial direction of a housing, and a second seal member is closely contacted with the outside thereof. A hole at the housing side is communicated with a long hole of a shield member in the movable range of a projecting portion and an engaging portion. The housing can be conductive. The housing and the shield member can be provided integrally. The housing includes a flange portion and ring walls. The ring wall fitted in a first stage ring portion of the shield member is contacted with a hole portion, the seal member is fitted with the outside of the seal member fitted with a second stage ring portion, and a shield electric wire is connected with a third stage ring portion by a shield sleeve. The ring portions can be provided in two steps, with a large diameter portion of a first seal member fitted into a first stage ring portion, and a second seal member provided at the opening end of the hole portion. A drain hole of the housing, a stopper holder and a cushion ring are provided.

15 Claims, 8 Drawing Sheets

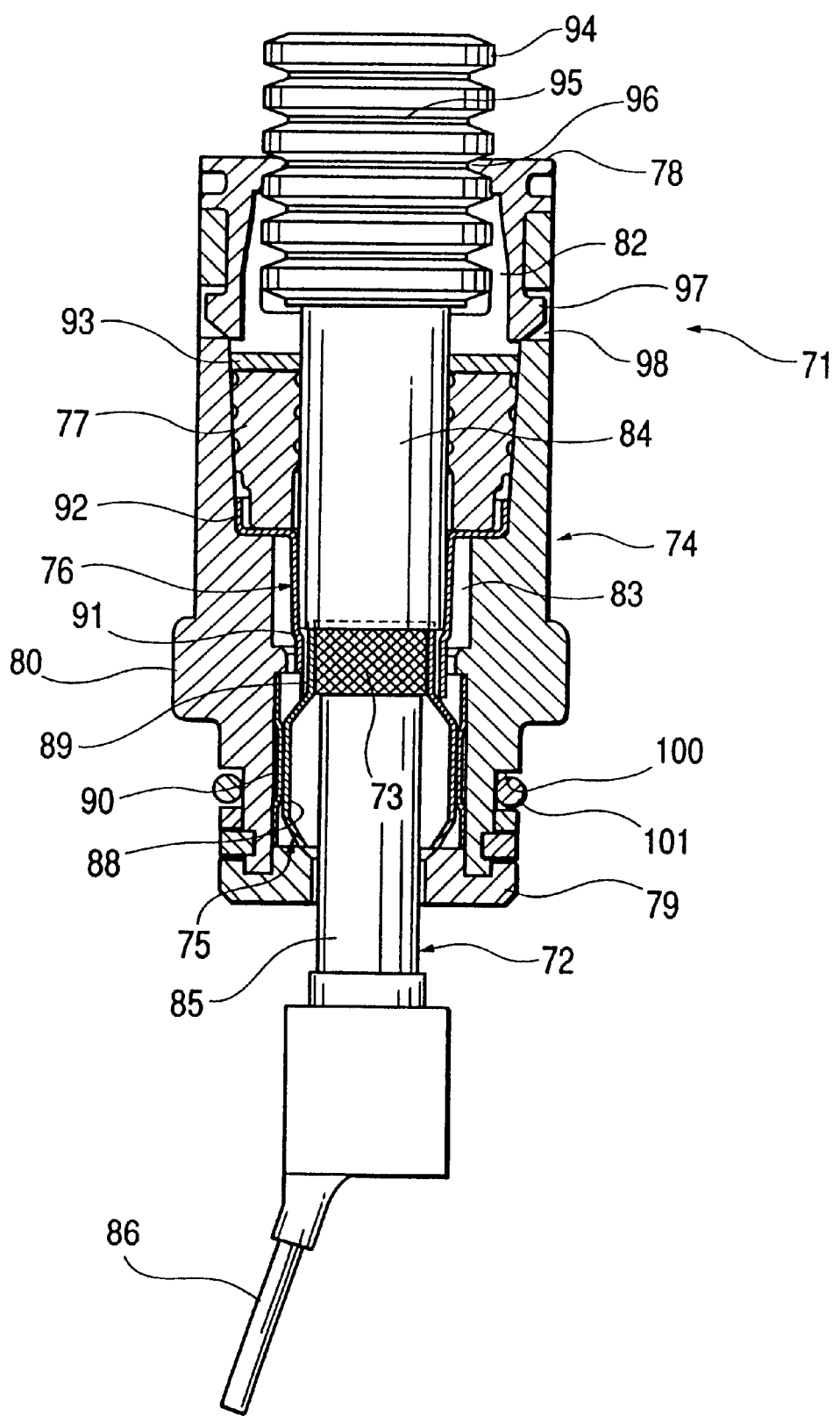

SHIELD CONNECTOR STRUCTURE

BACKGROUND OF THE INVENTION

1. Technical Field to which the Invention Belongs

The present invention relates to a shield connector structure, for example, for the terminal connection of a shield electric wire to a motor of an electric automobile as well as for the ground connection of a shield portion of the shield electric wire to a case of a device.

2. Related Art

FIGS. 12 to 14 show an example of general shield connector structures.

The shield connector structure is for connecting a metal case 87 (FIG. 7) of a motor as a device and a winding 73 of a shield electric wire 72 (FIG. 14) as well as for providing the waterproof property to the connecting portion.

The shield connector structure is for connecting a metal case 87 (FIG. 12) of a motor as a device with a winding 73 of a shield electric wire 72 (FIG. 14) as well as for providing the waterproof property to the connecting portion.

As shown in FIGS. 12 and 13, the housing 74 has a flange portion 80 integrally. The flange portion 80 has a bolt insertion hole 81 (FIG. 13) so as to be fixed to a counterpart metal case by fastening with a bolt (not illustrated). Accordingly, the ground connection of the housing 74 with the case 87 is achieved via the flange portion 80.

As shown in FIG. 14, a large diameter storage room 82 for inserting the seal member 77 in the upper half portion, and a small diameter storage room 83 for storing the metal shell 75 and the shield stopper 76 in the lower half portion are formed in the housing 74, respectively. The outer periphery surface of the seal member 77 is closely contacted with the inner periphery surface of the storage room 82, and the inner periphery surface of the seal member 77 is closely contacted with the outer periphery surface of an outside coat 84 of the shield electric wire 72. According to the seal member 77, entrance of water or dusts from the storage room 82 of the housing 74 into the case 87 (FIG. 12) is prevented.

The metal shell 75 has a lower side cylindrical large diameter portion 88 and an upper side cylindrical small diameter portion 89. The metal shell 75 is contacted with the inner periphery surface of the storage room 83 of the housing via a plurality of spring pieces 90 provided on the outside of the large diameter portion 88. The vertex portions of the spring pieces 90 are contacted with the outer periphery surface of the large diameter portion 88, and the upper and lower base portions of the spring pieces 90 are contacted with the inner periphery surface of the storage room 83. Further, the winding 73 of the shield electric wire 72 is connected with the small diameter portion 89 of the metal shell 75 as well as the small diameter portion 91 of the shield stopper 76 is positioned at the outside of the small diameter portion 89 so that the metal shell 75 is held without falling out. The winding 73 can also be provided between the metal shell 75 and the shield stopper 76.

An inside coat 85 of the shield electric wire 72 is inserted through the metal shell 75 so as to be projected to the outside from the lower side holder 79. The winding 73 is exposed to the outside of the outer periphery of the inside coat 85 by stripping the outside coat 84. The shield stopper 76 elongates above the metal shell 75, and the lower end face of the seal member 77 is contacted with the upper side large diameter portion 92 of the shield stopper 76.

The upper end face of the seal member 77 is forced by a stopping plate 93. A corrugate tube 94 for protection outside the shield electric wire 72 is stored partially above the seal member 77 in the upper side storage room 82. A nail portion 96 of the holder 78 is engaged with a groove portion 95 of the corrugate tube 94 so that the corrugate tube 94 is stopped. The holder 78 is engaged with a hole portion 98 of the housing 74 by engaged with an engaging arm 97.

The lower side holder 79 is engaged with the housing 74 by an engaging arm 99 (FIG. 12) in the peripheral direction. The holder 79 is contacted with the metal shell 75 and the spring pieces 90 so as to prevent fall out of the metal shell 75 and the spring pieces 90. A circumferential groove 100 is formed in the housing 74 above the holder 79. A seal ring 101 is mounted on the circumferential groove 100. As shown in FIG. 12, the seal ring 101 is closely contacted with the inner peripheral surface of a hole portion 102 of the case 87 so as to prevent entrance of water or dusts from the lower side of the flange portion 80 into the case 87.

A terminal 86 is connected with the tip of the shield electric wire 72 by clamping. The conductor portion is exposed by stripping the inside coat 85 (FIG. 14) of the shield electric wire 72. The terminal (LA terminal, that is, a round plate terminal for an automobile) 86 is connected with the conductor portion by clamping. The terminal 86 is connected with the terminal portion of the motor (not illustrated) with a bolt by fastening.

However, according to the general shield connector structure, many components such as the metal shell 75, the spring pieces 90 and the shield stopper 76 are required for connecting the winding (shield portion) 73 of the shield electric wire 72 with the housing 74 so that the structure becomes complicated and bulky. Besides, since an expensive elastic material is used for the spring pieces 90 as well as a member without deformation should be used for the cylindrical metal shell 75 to be contacted with the spring pieces 90 for a good contact with the spring pieces 90. A high processing accuracy is required for each component so as to soar the cost, and thus it is problematic. Moreover, since the components, such as the metal shell 75, the shield stopper 76 and the seal member 77 are arranged vertically, the structure becomes bulky in the height direction, and thus a problem arises in that the installation operation of the shield electric wire 72 in an automobile (the entire length of the shield electric wire 72 is relatively short, for example, about 300 mm) and the assembly operation the devices in the case 87 are difficult. Furthermore, since components with a complicated structure, such as the metal shell 75, the spring pieces 90 and the shield stopper 76 are used, a problem is involved in that the assembly operation is difficult and thus a long time is required for the assembly.

Moreover, as shown in FIG. 15A, in the case the housing is tilted 74 in inserting the shield connector 71 from the tip end holder 79 side into the hole portion 102 of the case 87, there is a risk of interference of the seal ring 101 above the holder 79 to the opening end 102a of the hole portion 102 or interposition between the holder 79 and the opening end 102a as shown in the circled enlarged view (see FIG. 15B) so that the seal ring 101 is flawed.

In contrast, FIG. 16 shows a general shield connector structure (device connection structure of a shield electric wire) disclosed in JP-A-5-251116.

In the structure, a conductive inside ring 106 is inserted along an inside coat 105 of a shield electric wire 104, a winding 107 of the shield electric wire 104 is contacted with the outer periphery surface of the inside ring 106, and a flange portion 108 of the inside ring 106 is contacted with a case 109 of the device. The winding 107 and an outside coat 110 are held by an outside ring 111 onto the inside ring 106 from the outside of the shield electric wire 104, with a flange portion 112 of the outside ring 111 fixed on the case 109 by a bolt 113. The shield electric wire 104 is held and fixed by the outside ring 111 and the inside ring 106. A terminal (LA terminal, not illustrated) is connected with the conductor portion (core wire) 114 of the shield electric wire 104 by pressing. The terminal is same as the terminal 86 shown in FIG. 12.

However, according to the above-mentioned structure, in the case when the terminal is connected and fixed with a device, such as a motor, the bonded surface of the terminal and the bonded surface of the device are displaced in the rotational direction (in the electric wire peripheral direction as shown in the arrow "a" in the figure), the shield electric wire 104 is twisted so that the terminal and the device cannot be connected well. In the case they are connected forcibly, a problem is involved in that a stress is applied on the shield electric wire 104 in the twisting direction so as to cause damage according to time passage. In contrast, in the case the flange portion 112 of the outside ring 111 is fixed with the case 109 after connecting the terminal with the device, a problem arises in that the hole positions for the bolts 113 in the flange portion 112 and the case 109 cannot be coincided, and thus the fixing operation cannot be executed appropriately.

In view of the above-mentioned problems in the related arts, an object of the invention is to provide a shield connector structure with a simple and compact structure at a low cost, capable of improving the installation operation in an automobile and the assembling property by reducing a length (height direction) in an axial direction, capable of certainly assembling even in the case the terminal and the device are displaced in the electric wire peripheral direction, and capable of preventing flowing of the seal member according to the tilt of the housing.

SUMMARY OF THE INVENTION

In order to achieve the above-mentioned object, the present invention is a shield connector structure including:

a housing including a insertion hole and flange portion, a shield electric wire being insertable to said insertion hole, said flange portion for fixation to a case for grand connection;

a conductive shield member connected to a wire shield portion of said shield electric wire;

a first seal member being closely contacted with said shield electric wire and said housing, said first seal member projecting from a tip end of said housing in axial direction to define a projecting portion of said first seal member, said conductive shield member closely contacted with an outer periphery of said projecting portion; and a second seal member being closely contacted with a hole portion of said case, said second seal member closely contacted with an outer periphery of said conductive shield member.

It is effective that a projecting portion for positioning is provided in either of the flange portion of the housing and the shield member, and an engaging portion corresponding to the projecting portion is provided in the other thereof. Moreover, it is also effective that a long hole corresponding to a bolt insertion hole at the flange portion side of the housing is provided in the shield member so that the bolt insertion hole is communicated with the long hole in the movable range between the projecting portion and the engaging portion. Furthermore, it is further effective that the housing is insulated, and a collar having a bolt insertion hole is provided in the flange portion of the housing. Moreover, it is also effective that the housing is conductive.

Furthermore, it is also effective that in a shield connector structure including:

a housing including a insertion hole and flange portion, a shield electric wire being insertable to said insertion hole, said flange portion for fixation to a case for ground connection;

a conductive shield part connected to a wire shield portion of said shield electric wire;

said housing and said conductive shield part formed integrally;

a first seal member being closely contacted with said shield electric wire and said housing, said first seal member projecting from a tip end of said housing in axial direction to define a projecting portion of said first seal member, said conductive shield part closely contacted with an outer periphery of said projecting portion; and a second seal member being closely contacted with said case, said second seal member closely contacted with an outer periphery of said conductive shield part.

Moreover, it is further effective that the housing includes the flange portion, and a ring wall projecting at both surface sides of the flange portion, positioned concentrically with the insertion hole. Furthermore, it is also effective that the shield member or the shield section includes three stage ring portions such that the ring wall of the housing is fitted in the inside of a first stage ring portion, the first stage ring portion is contacted with the hole portion, the projecting portion of the first seal member is fitted in the inside of a second stage ring portion, the second seal member is fitted in the outside of the second stage ring portion, and the shield portion of the shield electric wire is connected with a third stage ring portion.

Moreover, it is further effective that the shield member or the shield section includes two stage ring portions such that the ring wall of the housing and a large diameter portion of the first seal member are fitted in the inside of a first stage ring portion, the second seal member is fitted in the outside of the first stage ring portion, and the shield portion of the shield electric wire is connected with a second stage ring portion. Furthermore, it is also effective that the second seal member is positioned at the opening end of the hole portion of the case.

Moreover, it is further effective that the shield portion is connected with the third stage ring portion with a shield sleeve by fastening, and the shield sleeve comprises a brim portion, with the brim portion positioned facing to the second seal member. Furthermore, it is also effective that the shield portion is connected with the second stage ring portion with a cylindrical shield sleeve by fastening.

Moreover, it is further effective that a drain hole is provided in the housing, adjacent to the first seal member. Furthermore, it is also effective that a stopper holder is fitted in the ring wall of the housing, and the shield electric wire is fixed to the stopper holder. Moreover, it is further effective that a cushion member is mounted to the insertion tip side of the shield electric wire with respect to the hole portion of the case.

BRIEF DESCRIPTION OF THE DRAWINGS

FIG. 14 is a cross-sectional view taken on the line B—B of FIG. 12.

DETAILED DESCRIPTION OF PREFERRED EMBODIMENTS

Specific examples of embodiments of the invention will be explained in detail with reference to the drawings.

Figure 1:
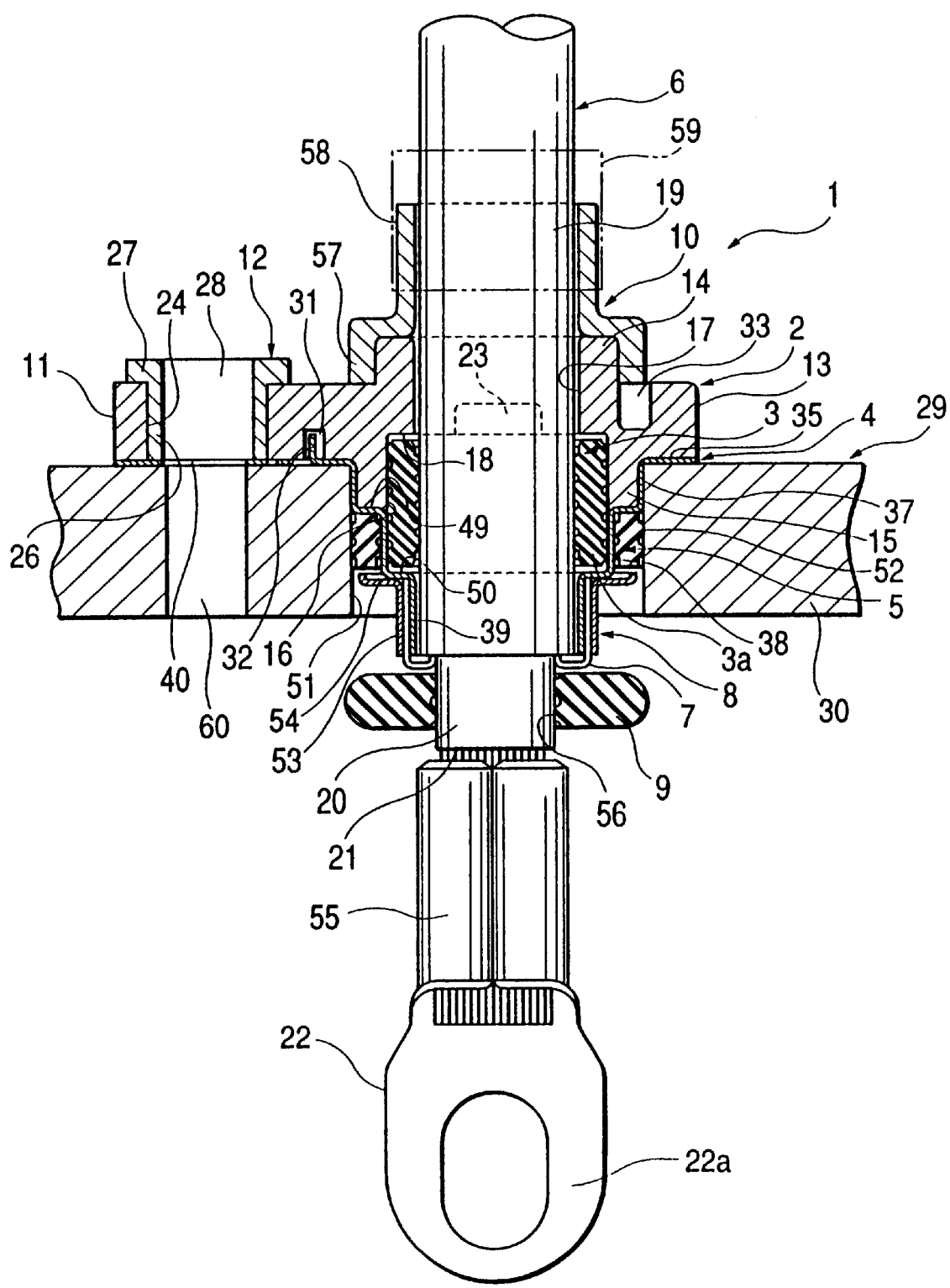
FIG. 1 is a vertical cross-sectional view showing a first embodiment of a shield connector structure according to the invention.

FIG. 1 shows a first embodiment of a shield connector structure according to the invention.

The shield connector structure includes: a synthetic resin housing 2; a rubber ring first seal member 3 mounted inside the lower half portion of the housing 2, partially projecting downward from the lower end of the housing 2; a conductive metal shield member 4 disposed along the lower surface of the housing 2, projecting in the axial direction with steps (three stages) along the outer peripheral surface of the housing 2 and a projecting portion 3a of the first seal member 3 and a shield electric wire 6; a rubber ring second seal member 5 mounted on the outer peripheral surface side of the shield member 4 at the outside with respect to the radial direction of the first seal member 3; a conductive metal shield sleeve 8 for fixing a winding (shield portion) 7 of the shield electric wire 6 in the state contacting with the outer peripheral surface of the shield member 4 from the outside by fastening; a rubber cushion ring (cushion member) 9 disposed at the tip side of the shield sleeve 8; a synthetic resin stopper holder 10 mounted at the upper end side of the housing 2; and a conductive metal collar 12 mounted on a brim-like flange portion 11 of the housing 2.

A shield connector (device directly-linking connector) 1 include the housing 2, the shield member 4, the first and second seal members 3, 5, the shield sleeve 8, the stopper holder 10 and the collar 12.

Figure 2:
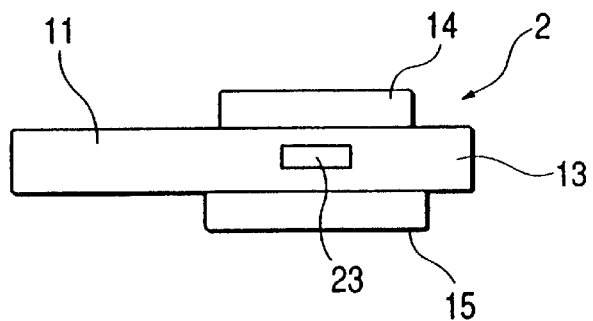
FIG. 2 is a side view of a housing of the shield connector.
Figure 3:
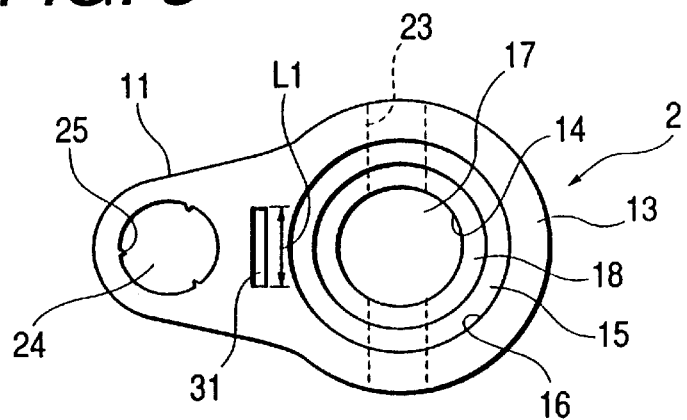
FIG. 3 is a bottom view of the housing.

As shown in FIGS. 2 and 3, the housing 2 has a round flange portion 13 and a brim-like flange portion 11 projecting from the round flange portion 13 in the same plane, integrally. At the center of the round flange portion 13, the housing 2 is provided a small diameter ring wall (boss portion) 14 at the upper side, and a large diameter ring wall (boss portion) 15 at the lower side. A large diameter round hole 16 is formed inside the large diameter ring wall 15, elongating to the middle portion in the height direction of the round flange portion 13. The first seal member 3 is inserted in the large diameter round hole 16.

A small diameter round hole (electric wire insertion hole) 17 is formed inside the small diameter ring wall 14, meeting concentrically with the large diameter round hole 16 at the middle portion in the height direction of the round flange portion 13. A step portion is provided at the upper end face 18 side of the large diameter round hole 16. An outside coat 19 of the shield electric wire 6 is inserted through the inner diameter portion of the ring seal member 3 from the small diameter round hole 17.

A pair of right and left rectangular drain holes 23 are formed through horizontally from the inner peripheral surface of the small diameter round hole 17 to the outer peripheral surface of the round flange portion 13 above the upper end face 18 of the large diameter round hole 16. The lower surface of the drain holes 23 is positioned in the same plane as the upper end face 18 of the large diameter round hole 16. Water entered into the small diameter round hole 17 along the outside coat 19 of the shield electric wire 6 cannot enter into the large diameter round hole 16 side owing to the first seal member 3 as well as it is discharged to the outside from the drain holes 23.

A round hole 24 for inserting a collar is formed vertically through the tip side of the brim-like flange portion 11. For example, projecting bars 25 (FIG. 3) are formed on the inner peripheral surface of the round hole 24 at three points with an equal interval. In pressing in the collar 12 (FIG. 1), the projecting bars 25 are crushed for the certain press-in. The projecting bars 25 are also effective for the accurate positioning of the collar 12. It is also possible to apply a spline process (not illustrated) on the outer periphery of the tip end side cylindrical portion 26 of the collar 12 for improving the press-in property and the positioning property.

The collar 12 includes a cylindrical portion 26 and a ring brim portion 27 formed integrally at the upper end side of the cylindrical portion 26. The tip end of the cylindrical portion 26 is contacted with pressure with the surface of the shield member 4, and the brim portion 27 is contacted with the flange portion 11 of the housing 2. By inserting a bolt (not illustrated) through the round hole (bolt insertion hole) 28 inside the cylindrical portion 26 so as to be fastened with the outer wall 30 of a case 29 of a counterpart device by screwing, the head portion of the bolt (not illustrated) forces the brim portion 27 of the collar 12, and the tip end of the cylindrical portion 26 makes the shield member 4 contact with the outer wall 30 of the case 29 with a strong pressure. Accordingly, the ground connection of the shield member 4 with the case 29 is achieved certainly.

A recess groove (engaging portion) 31 is formed between the round hole 24 of the flange portion 11 and the large diameter ring wall 15 at the rear surface (lower surface) side of the housing for rotation prevention and positioning with respect to the shield member 4. The recess groove 31 is formed with a narrow rectangular shape slightly shorter than the inner diameter of the round hole in the direction of the flange portion 11 width, and a depth of about half the thickness of the flange portion 11. The recess groove 31 is engaged with an upward projecting piece (projecting portion) 32 of the shield member 4. A recess groove 33 at the surface side of the round brim portion 13 of the housing 2 is provided for reducing the thickness and preventing warp.

Figure 4:
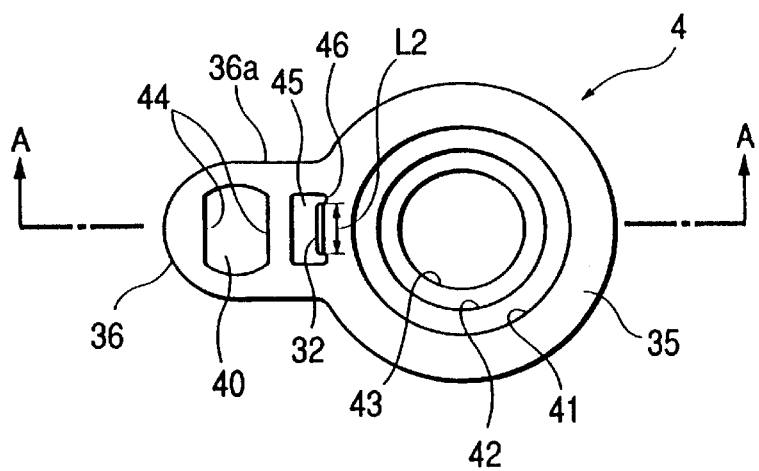
FIG. 4 is a top view of a shield member of the shield connector.
Figure 5:
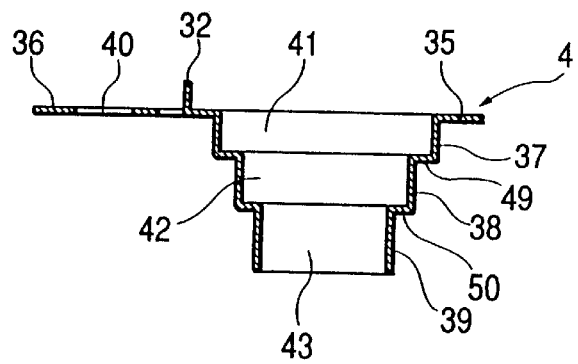
FIG. 5 is a cross-sectional view of the shield member taken on the line A—A in FIG. 4.
Figure 6:
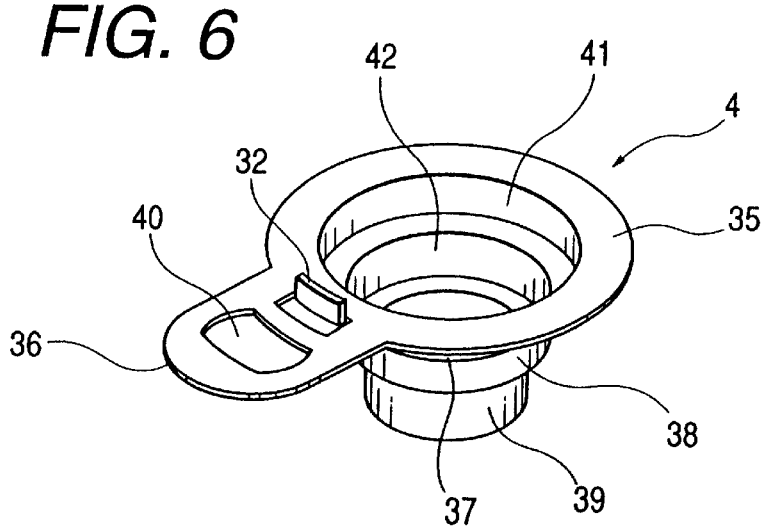
FIG. 6 is a perspective view of the shield member.

As shown in FIGS. 4 to 6, the shield member 4, which is formed by a press process of a conductive metal thin plate material, includes a round flange portion 35, a brim-like flange portion 36 projecting from the flange portion 35 in the same plane, and ring portions 37 to 39 formed from the round flange portion 35 with a plurality of steps (three stages).

The round flange portion 35 is formed with the same size (area) as the rear surface side of the round flange portion 13 of the housing 2 (FIG. 3). The brim-like flange portion 36, which has parallel portions 36a (FIG. 4) at both sides, is formed in the same length as the brim-like flange portion 11 (FIG. 3) of the housing 2, with the base end side formed slightly narrower than that of the flange portion 11. The flange portions 35, 36 of the shield member 4 are forced entirely by the flange portions 11, 13 of the housing 2 respectively for realizing a certain contact pressure with respect to the case 29 (FIG. 1).

A long hole 40 for inserting a bolt is formed at the tip end side of the brim-like flange portion 36 of the shield member 4 as well as the projecting piece 32 for engaging with the recess groove 31 (FIG. 3) of the housing 2 is formed between the long hole 40 and the round hole 41 inside the ring portion 37.

The shorter diameter of the long hole 40 is slightly larger than the outer diameter of the bolt (not illustrated), and smaller than the outer diameter of the tip end of the cylindrical portion 26 of the collar 12 (FIG. 1). Therefore, the tip end surface of the collar 12 can be contacted with the surface of the shield member 4 in the direction of the width of the long hole 40 certainly. The long hole 40 can be formed in an arc-like shape concentrically with the ring portion 37 (the long side portions 44 of the long hole 40 are formed like an arc each with a radius having the center point of the ring portion 37 as the origin), or the long side portions 44 (FIG. 4) can be formed parallel with each other. It is also possible to form the middle portion of each long side portion 44 projecting slightly downward (toward the case 29 side) so as to be contacted forcibly and elastically with the outer wall 30 of the case 29 (FIG. 1) as a projection. The longer diameter of the long hole 40 is set sufficiently larger than the outer diameter of the bolt (not illustrated). Accordingly, even in the case the position of the shield member 4 is displaced with respect to the housing 2 slightly in the circumferential direction, the bolt can be inserted through the long hole 40 certainly.

At the base end side of the brim-like flange portion 36, the rectangular projecting piece 32 is formed by cutting out vertically toward the surface side of the shield member 4. The space left after cutting out the projecting piece 32 serves as a rectangular opening 45 (FIG. 4). Small curved notch portions 46 are formed in the opening 45 at both sides of the projecting piece 32 for ensuring the cutting out accuracy of the projecting piece 32.

As shown in FIG. 1, the projecting height of the projecting piece 32 is set slightly shorter than the depth of the recess groove 31, and the thickness of the projecting piece 32, that is, the thickness of the shield member 4 is set thinner than the shorter diameter of the recess groove 31. The length L2 (FIG. 4) of the projecting piece 32 in the lateral direction is set shorter than the length L1 (FIG. 3) of the recess groove 31. The length L2 of the projecting piece 32 is about ½ of the length L1 of the recess groove 31.

According to the engagement of the projecting piece 32 with the recess groove 31, the rotation (displacement) in the peripheral direction of the shield member 4 with respect to the housing 2 can be prevented so as to improve the assembling property of the shield connector 1 as well as the position of the long hole 40 of the shield member 4 can be determined with respect to the round hole 28 of the collar 12 (a round hole for inserting through a bolt in the case of a conductive housing without using a collar 12) so as to facilitate and ensure the bolt inserting and screwing operations.

Figure 7:
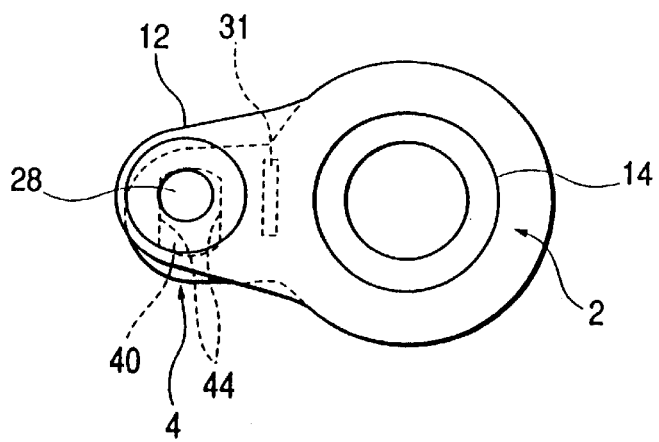
FIG. 7 is a top view showing the state with the housing and the shield member displaced in the peripheral direction.

In the case, the surface 22a of the terminal 22 and the surface of the device are not parallel but are displaced in the rotation direction centering the axis of the shield electric wire 6 at the time of connecting and fixing a terminal 22 (FIG. 1) with a device such as a motor (not illustrated), the terminal 22 and the device are bonded with the shield electric wire 6 twisted in the circumferential direction. At the time, the shield member 4 rotates integrally with the shield electric wire 6 so that the shield member 4 disposed below moves in the circumferential direction in the range of the long hole 40 with respect to the housing 2 disposed above for absorbing the displacement as shown in FIG. 7 (top view).

In the case the shield member is rotated with respect to the housing in the maximum degree, the end portion of the long diameter side of the long hole 40 is disposed immediately below the round hole 28 of the collar 12 (a round hole for inserting through a bolt in the case of a conductive housing). The length L2 of the projecting piece 32 and the length L1 of the recess groove 31 are set accordingly. At the time the end portion of the projecting piece 32 is contacted with the end portion of the recess groove 31, the end portion of the long hole 40 is disposed immediately below the round hole 28.

According to the above-mentioned configuration, the bolt (not illustrated) is screwed and inserted certainly into a screw hole 60 of the outer wall 30 of the case 29 (FIG. 1) from the round hole 28 of the collar 12 (or a round hole of a conductive housing) via the long hole 40 of the shield member 4 so that connection of the shield member 4 and fixation of the housing 2 can be executed certainly with respect to the case 29. Each long side portion 44 of the long hole 40 is formed preferably in an arc-like shape with a radius having the center of the ring wall 14 of the housing 2, that is, the center of the ring portion 37 of the shield member 4 or the round hole 41 (FIG. 5) as the origin.

The ring portions 37 to 39 (FIG. 5) of the shield member 4 are formed projecting in the direction opposite to the projecting direction of the projecting piece 32. The ring portion 37 at the first stage with a larger diameter step, the ring portion 38 at the second stage with a middle diameter step, and the ring portion 39 at the third stage with a small diameter cylindrical shape are formed integrally and continuously from the flange portion 35 side concentrically. The round holes 41 to 43 are formed as round accommodating spaces inside the ring portions 37 to 39.

As shown in FIG. 1, the large diameter ring wall 15 at the lower side of the housing 2 is fitted inside the first stage ring portion 37. The ring wall 15 can be inserted into the ring portion 37 easily by forcing the housing 2 slightly strongly with a hand. The assembly operation is quite easy. At the time, the first seal member 3 is fitted in the second stage ring portion 38 preliminarily so that the ring wall 15 can be inserted (pressed in) between the first seal member 3 and the first stage ring portion 37.

The first seal member 3 has a large number of ring lips 48 both at the inner periphery side and the outer periphery side. The height of the seal member 3 is substantially double as much as the height of the ring wall 15, and slightly shorter than the sum of the height of the second stage ring portion 38 and the depth of the round hole 16 inside the ring wall 15.

The outer peripheral surface of the ring wall 15 is substantially closely contacted with the inner peripheral surface of the first stage ring portion 37. The inner peripheral surface of the ring wall 15 is completely closely contacted with the outer peripheral surface of the upper half portion of the first seam member 3. The outer peripheral surface of the lower half portion of the first seal member 3 is closely contacted with the inner peripheral surface of the second stage ring portion 38. The inner peripheral surface of the first seal member 3 is closely contacted with the outer peripheral surface of the outside coat 19 of the shield electric wire 6. Accordingly, entrance of water from between the housing 2 and the shield member 4 into the winding 7 side of the shield electric wire 6, or entrance of water from the outer surface of the outside coat 19 of the shield electric wire to the winding 7 side can be prevented. The upper end face of the first seal member 3 is disposed contacting with or adjacent to the upper end face 18 of the round hole 16 inside the ring wall 15, and the lower end face of the seal member 3 is disposed contacting with or adjacent to the inner surface of the bottom portion 50 of the second stage ring portion 38. Accordingly, the first seal member 3 is positioned in the vertical direction so that fall out of the seal member 3 can be prevented.

Moreover, the rear surface of the round flange portion 13 of the housing 2 is contacted with the surface of the round flange portion 35 of the shield member 4. The lower end face of the ring wall 15 is contacted with the inner surface of the bottom portion 49 of the first stage ring portion 37. Since the ring wall 15 is fitted with the first stage ring portion 37, the housing 2 and the shield member 4 are positioned in the radial direction, and the center of the shorter diameter of the long hole 40 of the brim-like flange portion 36 (FIG. 4) is positioned at the center of the collar 12.

The rear surface of the round flange portion 35 of the shield member 4 is contacted with the upper end face of the outer wall 30 of the case 29 The outer peripheral surface of the first stage ring portion 37 is contacted with the inner peripheral surface of a hole portion 51 of the case 29. Accordingly, backlash of the housing 2 at the hole portion 51 of the case 29 is prevented as well as lift up of the flange portion 13 of the housing 2 can be prevented so that the shield member 4 and the case 29 are contacted certainly for achieving a high shield earth property.

The ring second seal member 5 is provided closely contacting with the outer peripheral surface of the second stage ring portion 38 at the outside of the lower half portion of the first seal member 3. The second seal member 5 is formed with a height as much as or less than the half of that of the first seal member 3, with a plurality of (two) ring lips 52 provided both at the inner periphery side and the outer periphery side. The thickness of the second seal member 5 is set slightly thicker than the half of the outer diameter difference of the first stage ring portion 37 and the second stage ring portion 38.

The inner peripheral surface of the second seal member 5 is closely contacted with the outer peripheral surface of the second stage ring portion 38, the upper end face of the second seal member 5 is closely contacted with the outer surface of the bottom portion 49 of the first stage ring portion 37, and the outer peripheral surface of the second seal member 5 is closely contacted with the inner peripheral surface of the hole portion 51 of the case 29. The lower end face of the second seal member 5 is positioned substantially in the same plane as the lower end face of the first seal member 3.

Since the second seal member 5 is disposed outside the first seal member 3 with the same height, the connector structure is provided compactly in the height direction compared with the case the two seal members 3, 5 are arranged in series. Moreover, since the lower half portion of the first seal member 3 is projected from the housing 2 and the second seal member 5 is provided thereon with the thin shield member 4 disposed therebetween on the projecting portion 3a of the first seal member 3, the connector structure is provided compactly also in the radial direction.

The outer peripheral surface of the outside coat 19 of the shield electric wire 6 is disposed along the inner peripheral surface of the third stage ring portion 39 of the shield member 4, the winding 7 of the shield electric wire 6 is folded back and disposed outside the third stage ring portion 39. The winding 7 is contacted with the outer peripheral surface of the ring portion 39. The conductive metal ring shield sleeve 8 is fitted to the outside of the winding 7. By fastening with pressure the shield sleeve 8 by a fastening jig (not illustrated) to the ring portion 39, for example, in a hexagonal shape, the winding 7 is connected and fixed with the ring portion 39 with a strong contact pressure. The winding 7 exposed to the outer peripheral surface side of the inside coat 20 of the shield electric wire 6 is fold back along the outer peripheral surface of the outside coat 19.

The shield sleeve 8 includes a cylindrical portion 53 to be fastened with pressure, and a round brim portion 54 formed integrally at the upper end of the cylindrical portion 53. The brim portion 54 is contacted with the outer surface of the bottom portion 50 of the second stage ring portion 38 and is projected outward from the bottom portion 50 with a ring shape for forming a fitting groove for the second seal member 5 between the bottom portion 49 of the first ring portion 37 and the brim portion 54. According to the brim portion 54, fall out of the second seal member 5 to the downward direction can be prevented. Since the brim portion 54 serves also as a portion of the fitting groove for the second seal member 5, a simple and compact structure can be provided at a low cost.

In the state that a low hardness flexible rubber cushion ring 9 is fitted with the outer periphery of the inside coat 20 of the shield electric wire 6, the terminal is pressed and connected with the conductor portion 21 projecting from the inside coat 20. The outer diameter of the cushion ring 9 is formed slightly larger than the inner diameter of the hole portion 51 of the case 29. A ring lip 56 to be closely contacted with the inside coat 20 of the shield electric wire 6 is formed at the inner diameter side of the cushion ring 9.

The cushion ring 9 increases the creeping distance between the winding 7 and a pressed portion 55 of the terminal 22 in the case 29 for realizing the certain insulation, serves as a cushion at the time of inserting the shield connector 19 into the hole portion 51 of the case 29 for preventing interference of the exposed portion at the tip end side of the winding 7 and the opening end of the hole portion 51. Furthermore, by inserting the cushion ring 9 into the hole portion initially, the shield connector can be disposed vertically without tilt with respect to the hole portion 51 so as to be inserted straight in the state, and thus interference (clash) of the second seal member 5 and the opening end of the hole portion 51 or involvement of the seal member 5 can be prevented so that flaw of the second seal member 5 can be prevented.

The synthetic resin, metal or rubber ring stopper holder 10 is fitted with the outside of the small diameter ring wall 14 above the housing 2. The stopper holder 10 includes a short large diameter portion 57 to be fitted and closely contacted with the ring wall 14, and a long cylindrical small diameter portion 58. The outside coat 19 of the shield electric wire 6 is inserted through the inside of the small diameter portion 57. For example, by winding a vinyl tape 59 from the outer peripheral surface of the small diameter portion 58 to the outside coat 19, the shield electric wire 6 is fixed to the stopper holder 10 and entrance of water or dusts into the stopper holder can be prevented as well as lift up of the housing 2 can be prevented. The stopper holder 10 allows fixation and simple water proof of the shield electric wire 6.

Since the stopper holder 10 is an auxiliary member, it can be replaced by elongation of the ring wall 14 above the housing 2.

It is also possible to provide a projecting portion (not illustrated) at the housing 2 in place of the projecting piece 32 of the shield member 4, and a hole portion (engaging portion) in the shield member 4, corresponding to the projecting portion in place of the recess groove 31 of the housing 2.

Moreover, the water proof property can further be improved by providing a recess groove (not illustrated), for example, from the large diameter round hole 16 of the housing 2 to the upper side ring wall 14 and elongating the first seal member 3 so as to be engaged into the recess groove. Furthermore, it is also possible to provide a shield portion such as an aluminum foil (not illustrated) in place of the winding 7 of the shield electric wire 6.

Moreover, it is also possible to form the housing 2 with a conductive metal material such as aluminum. In this case, the collar 12 can be eliminated and a round hole (not illustrated) for inserting a bolt is formed in the flange portion 11. The round hole is formed with an inner diameter substantially the same length as the round hole 28 of the collar 12 or the shorter diameter of the long hole 44 of the shield member 4 so that the size absorption with respect to the displacement of the terminal 22 can be enabled in the rotational direction in the range of the long hole 44. The lower surface of the housing 2 is entirely contacted with the upper surface of the shield member 4 electrically.

Although the connector 1 is fixed with the upper wall (outer wall) 30 of the case 29 in the upright state in the above-mentioned embodiment, the shield connector 1 can be fixed horizontally with the side wall (outer wall) of the case 29. In this case, the drain holes 23 of the housing 2 are disposed in the horizontal direction or can be eliminated.

Furthermore, the housing 2 can be formed with a conductive metal material such as aluminum as well as the shield member (shield section) 4 can be formed integrally with the housing 2. In this case, the flange portions 35, 36, the first stage ring portion 37 and the bottom portion 49 thereof, which are the portions bonded with the shield member (shield section) 4 with respect to the housing 2 (for the convenience of the explanation, the same numeral is applied), are completely integrated with the housing 2, that is, become the housing 2. The second stage ring portion 38 and the third stage rig-like portion 39 project from the ring wall 15 of the housing 2. The round hole (not illustrated) for inserting through a bolt in the flange portion 11 of the housing 2 has a diameter slightly larger than the bolt. The recess groove 31 and the projecting piece 32 are eliminated. The first seal member 3 is inserted from the upper side round hole 17 and attached in the housing 2. According to the integration of the housing 2 and the shield member (shield section) 4, the number of components and the number of assembly operations can be cut back so that the production cost can be reduced as well.

Figure 8:
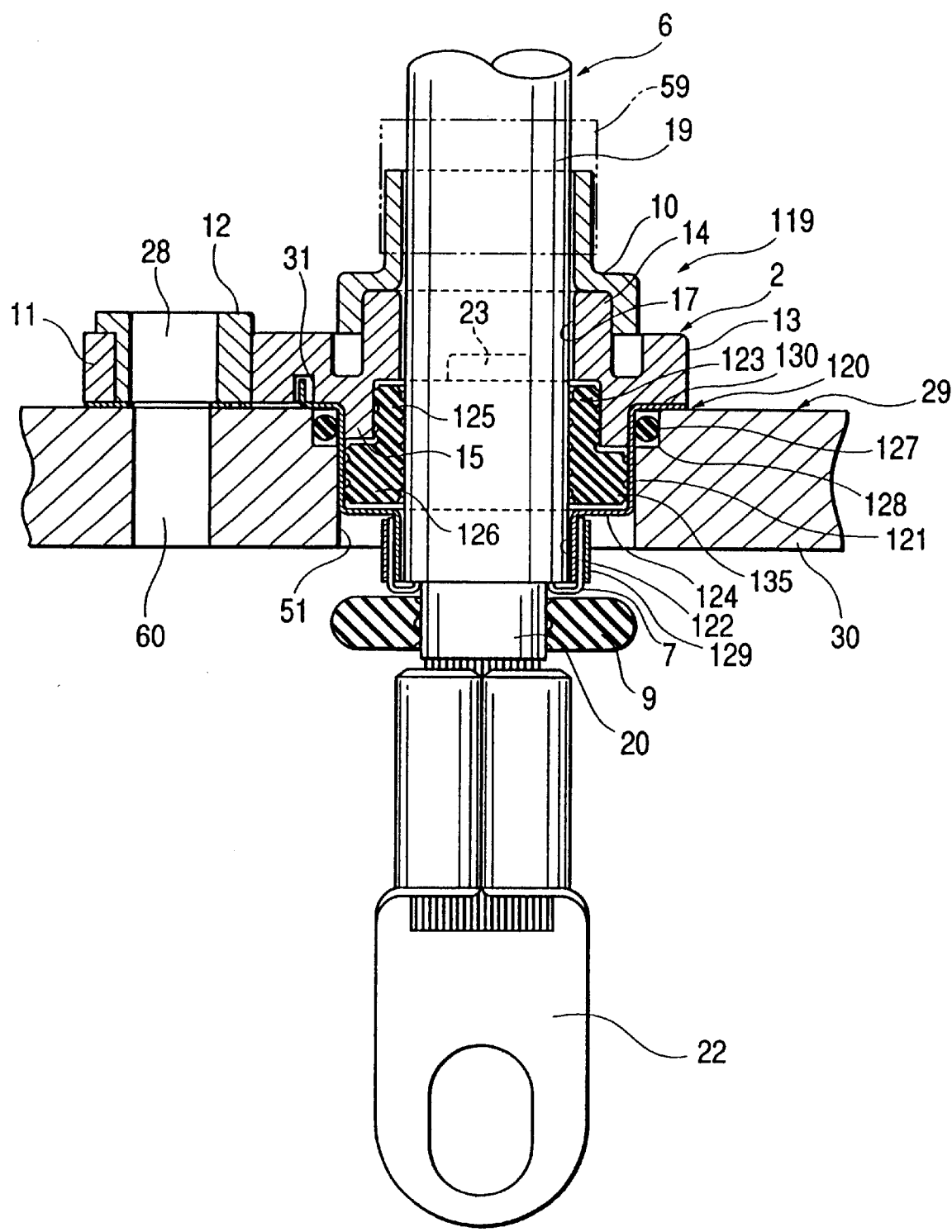
FIG. 8 is a vertical cross-sectional view showing a second embodiment of a shield connector structure according to the invention.

FIG. 8 shows a second embodiment of a shield connector structure according to the invention. The same numerals are applied to the same components as in the first embodiment and a detailed explanation is not provided.

The shield connector structure has the substantially same housing 2 as in the first embodiment. The ring portions 121, 122 of the shield member 120 are provided in two stages, with the first stage ring portion 121 formed longitudinally and the first seal member 123 formed with steps to the upper side and the lower side, and the large diameter portion (projecting portion) 126 of the first seal member 123 disposed at the bottom portion 124 side of the first ring portion 121 so that the second seal member (numeral 5 in FIG. 1) of the first embodiment is eliminated from the bottom portion 124 side of the first stage ring portion 121. A circumferential groove 128 for mounting the second seal member 127 is provided at the opening rim of the hole portion 51 of the case 29 so that the second seal member 127 is disposed at the outer periphery of the base side of the first stage ring portion 121.

The shield connector 119 includes: the synthetic resin housing 2; the ring first seal member 123 with steps with the small diameter portion 125 fitted in the inside of the ring wall 15 below the housing 2 and the large diameter portion 126 projecting downward from the ring wall; the conductive metal shield member 120 disposed along the lower surface of the housing 2, projecting in the axial direction (downward) with two stages along the outer peripheral surface of the large diameter portion 126 of the first seal member 123 and the outside coat 19 of the shield electric wire 6; the conductive metal cylindrical shield sleeve 129 for fixing the winding (shield portion) 7 of the shield electric wire 6 in the state contacting with the outer peripheral surface of the shield member 120 from the outside by fastening; the synthetic resin stopper holder 10 mounted at the upper end side of the housing 2; and the conductive metal collar 12 mounted on the brim-like flange portion 11 of the housing 2. The rubber cushion ring 9 is disposed at the tip end side of the shield sleeve 129, closely contacting with the inside coat 20 of the shield electric wire 6.

The ring circumferential groove 128 is formed at the upper opening end of the hole portion 51 of the outer wall 30 of the case 29 for mounting the second seal member 127. As the second seal member 127, for example, a commercially available O ring can be used. The circumferential groove 128 is formed with a rectangular cross-section, with the upper surface of the outer wall 30 and the inner peripheral surface of the hole portion 51 notched. With the second seal member 127 in the free state (in the state that the second seal member 127 mounted in the circumferential groove 128 without inserting the shield connector 119 in the hole portion), the outer peripheral portion of the second seal member 127 is projected from the upper surface of the outer wall 30 and the inner peripheral surface of the hole portion 51. According to the insertion of the shield connector 119 into the hole portion 51, the second seal member 127 is closely contacted with the lower surface of the round flange portion 130 of the shield member 120 and the outer peripheral surface of the first stage ring portion 121.

The second seal member 127 can be mounted preliminarily in the circumferential groove 128, or assembled on the outer periphery of the first stage ring portion 121 of the shield member 120. In the case the second seal member 127 is assembled with the shield member 120, the second seal member 127 is closely contacted with the intersecting portion of the first stage ring portion 121 and the flange portion 130 so as to be held stably without falling out. Since the second seal member 127 in this embodiment is disposed at the base side (the flange portion 130 side) of the shield member 120 and not at the middle portion in the height direction of the shield member 4 (FIG. 1) unlike the first embodiment, there is no risk of interference of the second seal member 127 with the opening end of the hole portion 51 at the time of inserting the shield connector 119 into the hole portion.

Figure 9:
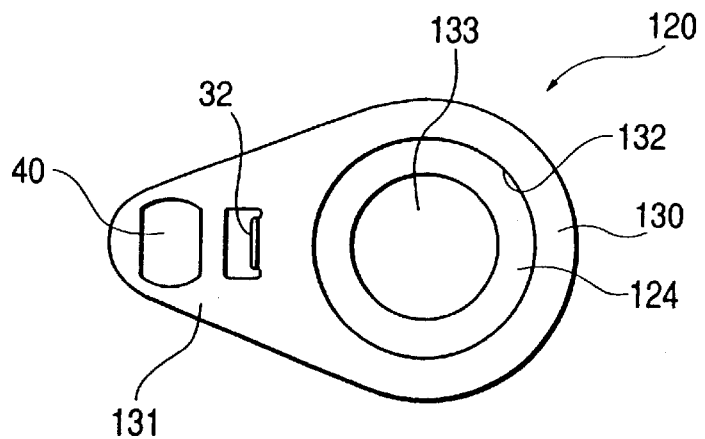
FIG. 9 is a top view of a shield member of the shield connector.
Figure 10:
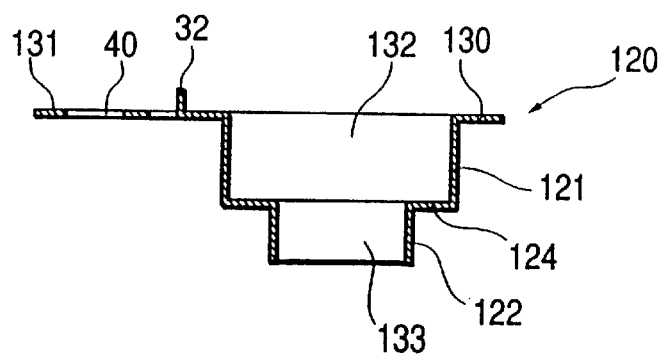
FIG. 10 is a vertical cross-sectional view of the shield member.
Figure 11:
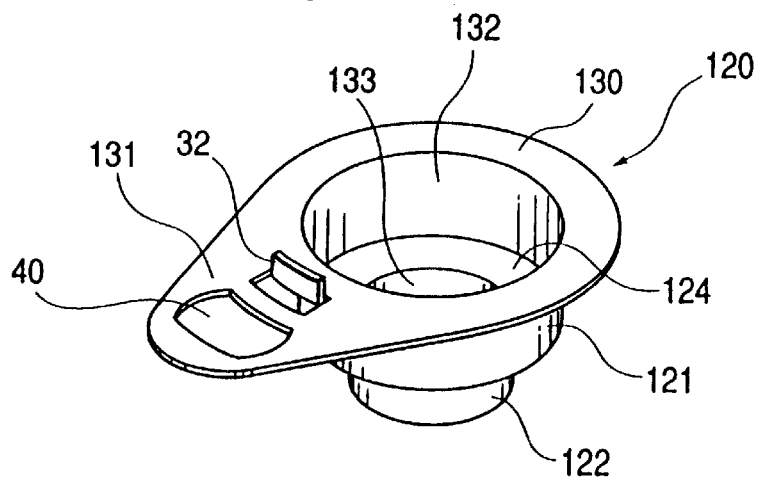
FIG. 11 is a perspective view of the shield member.
Figure 12:
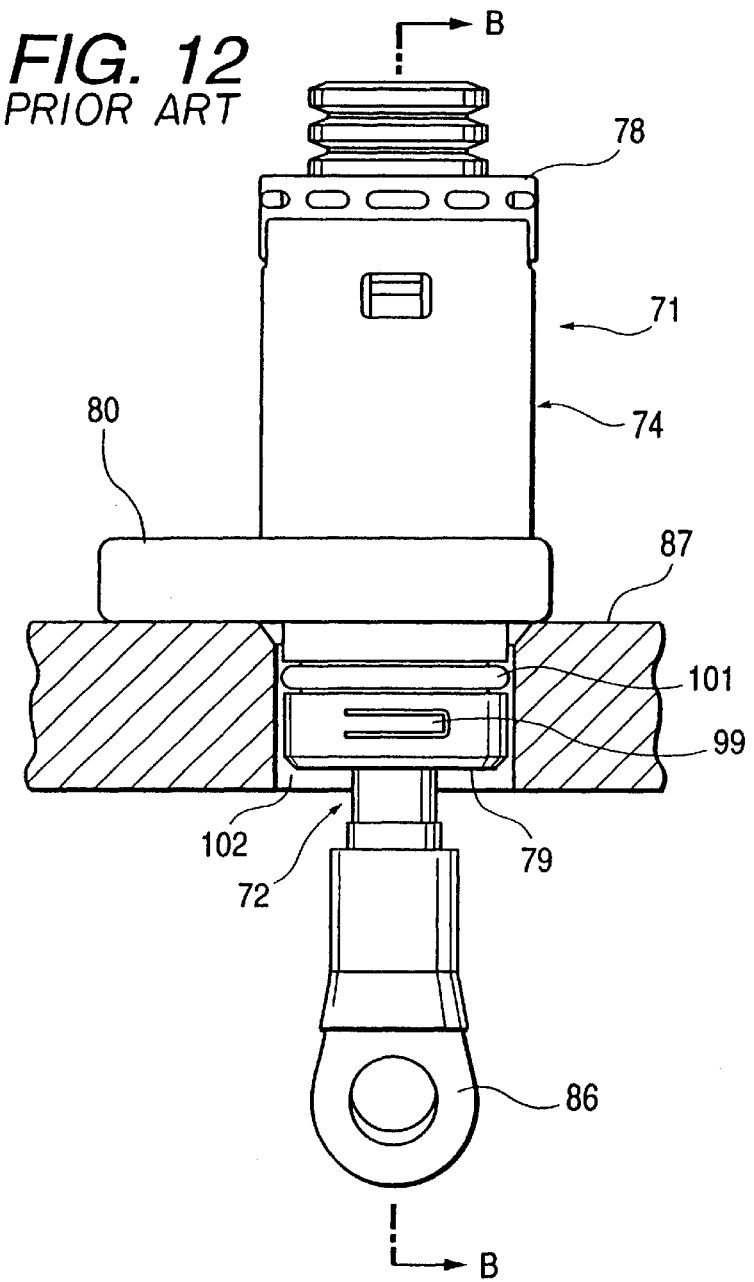
FIG. 12 is a plan view of an example of a general shield connector structure.
Figure 13:
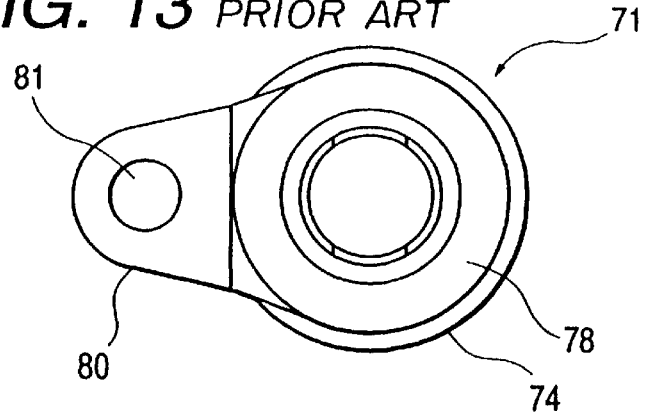
FIG. 13 is a top view showing the general shield connector.
Figure 15A:
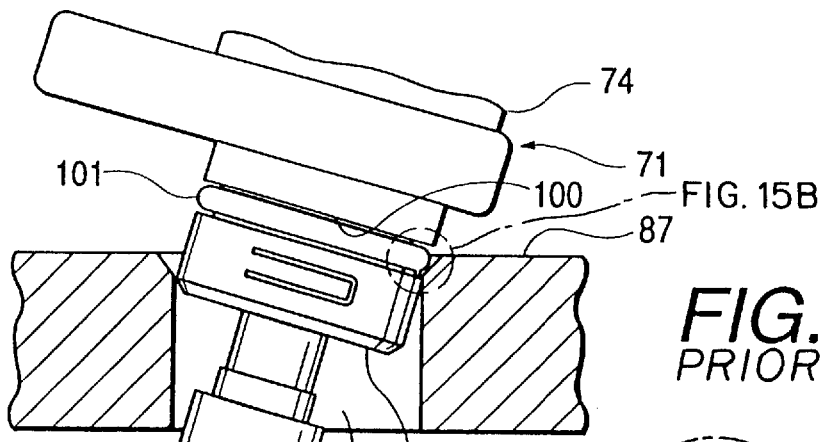
FIG. 15A is a plan view showing a problem of the general shield connector structure.
Figure 15B:
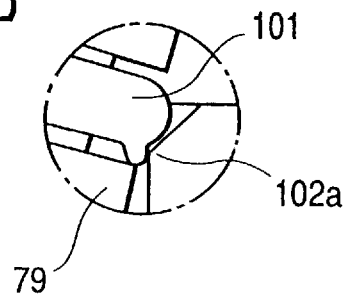
FIG. 15B is an enlarged view of the area C of FIG. 15A.
Figure 16:
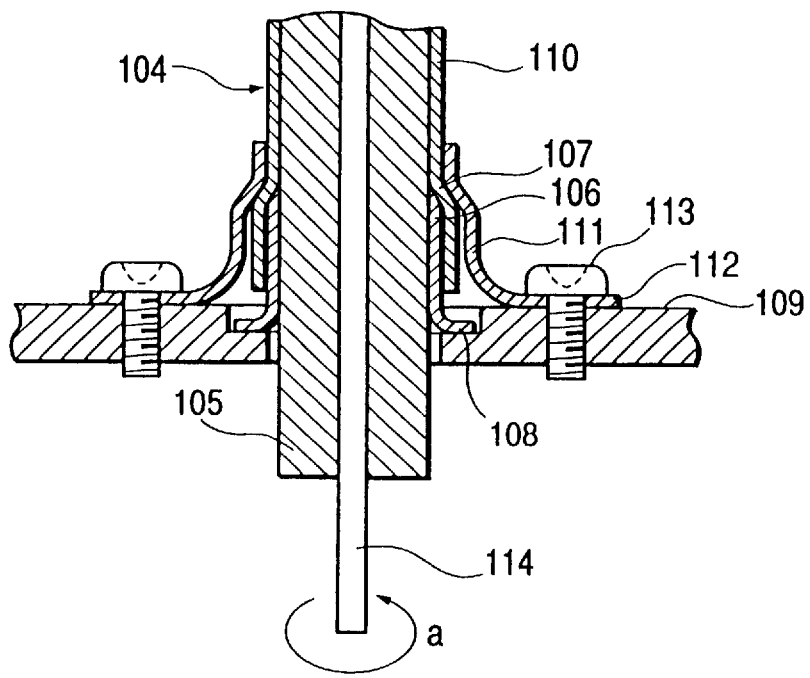
FIG. 16 is a vertical cross-sectional view showing another example of a general shield connector structure.

As shown in FIGS. 9 to 11, the shield member 120 includes the round flange portion 130 in the horizontal direction, the brim-like flange portion 131 elongating from the flange portion 130, and the first stage ring portion 121 projecting downward vertically from the round flange portion 131, and the second stage ring portion 122 formed concentrically with the first stage ring portion 121 with a smaller diameter, projecting vertically from the bottom portion 124 of the first stage ring portion 121.

The first stage ring portion 121 has the same diameter as the first stage ring portion 37 (FIG. 5) of the first embodiment and the height equal to the sum of those of the first stage ring portion 37 and the second stage ring portion 38 (FIG. 5) of the first embodiment. The second stage ring portion 122 of this embodiment has the same shape as the third stage ring portion 39 (FIG. 5) of the first embodiment. In the brim-like flange portion 131 are formed the projecting piece 32 for rotation prevention and positioning in the circumferential direction, and the long hole 40 disposed between the round hole 28 of the collar 12 (FIG. 8) and the screw hole 60 of the case 29 (FIG. 8). The shape of the brim-like flange portion 131 can be the same shape as in the first embodiment (FIG. 4), but the contact area with respect to the case 29 is increased in this embodiment. The effect of the projecting piece 32 and the recess groove 31 (FIG. 8) at the housing side is the same as the first embodiment.

The large diameter round hole 132 inside the first stage ring portion 121 is formed continuously and concentrically with the small diameter round hole 133 inside the second stage ring portion 122 at the bottom portion 124 side. The first stage round hole 132 is formed deeper than the second stage round hole 133. Since the ring portions 121, 122 are formed in the two stages, the structure can be simpler than the first embodiment, and thus the press molding (production) of the shield member 120 can be facilitated.

As shown in FIG. 8, the first seal member 123 includes the small diameter portion 125 disposed at the inside (in the round hole) of the ring wall 15 below the housing 2, and the large diameter portion 126 projecting downward from the ring wall 15 and disposed along the lower end face of the ring wall 15. The inner peripheral surfaces of the small diameter portion 125 and the large diameter portion 126 of the same size are closely contacted with the outer peripheral surface of the outside coat 19 of the shield electric wire 6. A large number of ring lips 134 are formed on the inner peripheral surface of the first seal member 123.

The first seal member 123 is assembled (inserted) from the end portion of the shield electric wire 6, sliding along the outer peripheral surface of the outside coat 19. At the time, the large diameter portion 126 improves the rigidity of the first seal member 123 so as to prevent turning up (inversion of the front and rear sides) of the seal member 123. Accordingly, the assembling property of the seal member 123 can be improved as well as the insertion direction of the seal member 123 can be determined easily.

The outer peripheral surface of the small diameter portion 125 is closely contacted with the inner peripheral surface of the ring wall 15 of the housing 2, and the outer peripheral surface of the large diameter portion 126 is closely contacted with the inner peripheral surface of the first stage ring portion 121 of the shield member 120. A plurality of the ring lips 135 are formed on the outer peripheral surface of the first seal member 123. The upper end face of the small diameter portion 125 is contacted with the upper surface of the round hole inside the ring wall 15, and the upper end face of the large diameter portion 126 is contacted with the lower surface of the bottom portion 125 of the first stage ring portion 121 of the shield member 120.

A ring groove for accommodating the large diameter portion 126 of the seal member 123 is formed between the ring wall 15 and the bottom portion 124 of the first ring portion 121. The small diameter portion 125 is accommodated inside the housing 2, and the large diameter portion 126 is accommodated inside the shield member 120 so that the first seal member 123 is held by the housing 2 and the shield member 120 in the vertical direction without falling out.

The first stage ring portion 121 of the shield member 120 is contacted stably with the inner peripheral surface of the hole portion 51 with an area larger than that of the first embodiment. In particular, since the second seal member 127 is disposed at the upper opening end of the hole portion 51 and the first stage ring portion 121 is inserted to a deep position in the hole portion 51, backlash of the shield connector 119 in the radial direction and backlash of the shield connector 119 at the time of bending the shield electric wire 6 can be prevented certainly. The flange portion 130 of the shield member 120 is held between the case 29 and the housing 2. According to the second seal member 127, entrance of water into the hole portion 51 from between the case 29 and the shield member 120 can be prevented at the inlet side of the hole portion 51.

The round hole of the ring wall 15 below the housing 2 is formed continuously with the round hole 17 of the small diameter ring wall 14 disposed above via the step (upper end face). The outside coat 19 of the shield electric wire 6 is inserted through the upper side round hole 17. The inner diameter of the first seal member 123 is set smaller than the upper side round hole 17. The outside coat 19 of the shield electric wire 6 elongates via the inner diameter portion of the first seal member 123 and the inside of the second stage ring portion 122 of the shield member 120 to the position at the lower end of the second stage ring portion 122 so that the winding 7 is fold back from the tip end of the outside coat 19 to the outside of the second stage ring portion 122, with the cylindrical shield sleeve 129 disposed outside the winding 7. By fastening the shield sleeve 129, the winding 7 is connected and fixed strongly between the shield sleeve 129 and the second stage ring portion 122.

Unlike the shield sleeve 8 (FIG. 1) of the first embodiment, the shield sleeve of this embodiment is not provided with a brim portion 54 (FIG. 1) so as to provide a simpler structure. Since the second seal member 127 is disposed at the opening end of the hole portion 51 in this embodiment, the second seal member 5 (FIG. 1) needs not be held by the brim portion 54 as in the first embodiment. Moreover, since the shield sleeve 129 does not require distinction of the upper and lower sides, automation of supply, assembly, and fastening of the shield sleeve 129 can be enabled.

The elastic cushion ring 9 is inserted into the inside coat 20 of the shield electric wire 6 at the lower end side of the shield sleeve 129. At the time of inserting the shield connector 119 into the hole portion 51, the cushion ring 9 prevents interference of the winding 7 and the shield sleeve 129 with the opening end of the hole portion 51 and the second seal member 127 so as to prevent flaw of the winding 7 and the second seal member 127.

The stopper holder 10 is fitted onto the ring wall 14 above the housing 2, the shield electric wire 6 is fixed with the stopper holder 10 by the vinyl tape 59, and accordingly the housing 2 and the first seal member 123 are forced against the shield member 120 so as to be held stably between the stopper holder 10 and the shield member 120 without backlash in the axial direction. By inserting the bolt (not illustrated) into the collar 12 for screwing into the screw hole 60 of the case 29, the shield member 120 is closely contacted with the case 29 and the shield connector 119 is fixed with the case 29 firmly. In FIG. 8, the numeral 23 denotes a drain hole.

It is also possible to provide the housing 2 with a conductive metal as in the first embodiment or to apply the conductive plating at the lower surface of the housing 2. In this case, the collar 12 is eliminated. Moreover, it is also possible to form the housing 2 and the shield member (shield section) 120 integrally with a conductive metal. In this case, the thin first ring portion 121 projects integrally from the ring wall 15 below the housing 2, and the second ring portion 122 is provided continuously with the first stage ring portion 121. The displacement of the terminal 22 in the rotational direction can be dealt with by providing the bolt insertion hole of the flange portion 11 of the housing as a long hole.

As heretofore mentioned, since the first seal member and the second seal member are disposed in the radial direction but not in the axial direction, the shield connector can be provided with a compact form in the axial direction (height direction) so that the installation operation in an automobile and the assembly operation can be improved. Moreover, since the housing can be formed shorter in the axial direction for the amount of projection of the first seal member, the resin housing molding can be facilitated. Since the projecting portion is engaged with the engaging portion, the rotation of the shield member in the peripheral direction with respect to the housing can be prevented (positioned) so that the assembling property of the shield connector with respect to the case can be improved. Even in the case the shield member is displaced in the peripheral direction, the bolt can be inserted certainly in the range of the long hole and thus the assembling operation property can be improved. In particular, since the shield member can be rotated with respect to the housing in the range of the long hole, the terminal and the device can be connected certainly by absorbing the displacement in the rotational direction of the terminal at the tip end side of the shield electric wire and the device. Therefore, the positioning accuracy of the terminal in the rotational direction can be rough so that the production can be facilitated. The collar is contacted (contacted with pressure) with the shield member certainly so that the shield member is forced against the case for achieve certain earth connection. The collar is eliminated so that the number of components, the component cost and the number of the assembling operations can be cut back. Furthermore, the assembling operation of the housing and the shield member can be eliminated, and thus the component cost and the number of the assembling operations can be cut back. The housing can be provided thinner in the height direction compared with the general products so that the shield connector can be compact in the axial direction (height direction) as well as molding of the housing can be facilitated and achieved at a low cost.

Since the conductive metal shield member or the first stage ring portion of the circumferential groove is contacted with the inner surface of the hole portion of the conductive metal case, backlash of the shield connector with respect to the case can be prevented as well as the contact area with the case is increased so as to improve the reliability of the earth connection. Moreover, since the ring wall of the housing is held between the first stage ring portion and the elastic first seal member, the housing can be positioned in the radial direction without falling out, and thus the operations including transportation and the assembling in the case can be facilitated. Furthermore, since the first seal member is positioned inside the second stage ring portion, and the second seal member is positioned adjacently at the outside with respect to the projecting portion of the first seal member via the shield member or the circumferential groove much thinner than the housing, compactness in the axial direction and compactness in the radial direction can be achieved. Moreover, since the shield portion of the shield electric wire is connected with the third stage ring portion, earth connection of the shield electric wire with the case can be achieved certainly via the shield member or the circumferential groove. Since the fixation of the housing, the fixation of the seal member and the connection of the shield electric wire can be executed simultaneously by the shield member or the circumferential groove as mentioned above, a simple and compact structure can be provided at a low cost. Furthermore, since assembly of the shield member, the seal member and the housing can be completed only by the simple operation of assembling the first seal member with the shield member and fitting the ring wall of the housing thereon, the number of the assembling operations can be reduced so that the productivity can be improved.

Moreover, the structure of the shield member or the circumferential groove can be provided simpler at a low cost and the molding can be facilitated compared with the above-mentioned configuration. Furthermore, since the first stage ring portion is introduced deeper in the hole portion of the case compared with the above-mentioned configuration, backlash of the shield connector with respect to the case can be prevented further certainly. Moreover, since the ring wall of the housing is held between the first stage ring portion and the first seal member as in claim 8, the housing can be positioned in the radial direction without falling out so that the operations including transportation and the assembly in the case can be facilitated. Furthermore, compactness in the axial direction and compactness in the radial direction can be achieved. Moreover, since the fixation of the housing, the fixation of the seal member and the connection of the shield electric wire can be executed simultaneously by the shield member or the circumferential groove, a simple and compact structure can be provided at a low cost. Furthermore, since assembly of the shield member, the seal member and the housing can be completed only by the simple operation of assembling the first seal member with the shield member and fitting the ring wall of the housing thereon, the number of the assembling operations can be reduced so that the productivity can be improved.

Moreover, since the second seal member is disposed backward with respect to the shield connector insertion direction in the hole portion, interference of the second seal member and the opening end of the hole portion can be prevented, and thus flaw of the second seal member can be prevented. Since the shield portion of the shield electric wire is connected with the shield member certainly and firmly by the shield sleeve as well as the brim portion of the shield sleeve provides an accommodating groove with the ring portion of the shield member for the second seal member, the labor for forming the seal accommodating groove in the general housing can be eliminated and thus a simple structure can be provided at a low cost. The configuration of the shield sleeve can be simpler than the above-mentioned shield sleeve so as to achieve a lower cost.

Moreover, water entered into the housing can be discharged from the drain holes to the outside without remaining on the first seal member, and thus the inside of the housing can be maintained always in the dry state. Since the stopper holder is fitted with the ring wall, simple water proof and dust proof can be achieved. Moreover, since the shield electric wire is fixed with the stopper holder, the strength of the shield connecting portion and the reliability of the seal portion can be ensured with respect to tension or bend of the shield electric wire as well as the housing and the shield member are bonded certainly. Furthermore, interference of the tip end portion of the shield connector and the opening end of the hole portion can be prevented by the cushion member as well as tilt of the shield connector can be corrected by inserting the cushion member initially into the hole portion at the time of inserting the shield connector into the hole portion of the case so that interference of the second seal ring and the opening end of the hole portion can be prevented and thus flaw of the second seal ring can be prevented certainly.

What is claimed is:

1. A shield connector structure comprising:
   a housing including an insertion hole and a flange portion, wherein a shield electric wire is insertable into said insertion hole, and said flange portion is attachable to a case for ground connection;
   a conductive shield member connected to a wire shield portion of said shield electric wire;
   a first seal member contacting said shield electric wire and said housing, said first seal member circumscribing said shield electric wire and including:
   a first longitudinal portion disposed between said housing and said shield electric wire, and
   a second longitudinal portion projecting from said housing in an axial direction, wherein an interior surface of said conductive shield member contacts an outer periphery of said second longitudinal portion; and
   a second seal member contacting a hole portion of said case, wherein an inner periphery of said second seal member contacts an exterior surface of said conductive shield member,
   wherein said second seal member circumscribes at least part of said first seal member, and
   wherein said first seal member extends from a first axial position to a second axial position along said shield electric wire, and said second seal member is disposed at least partially between said first and second axial positions.

2. A shield connector structure according to claim 1, wherein said housing is insulated, and further comprises a collar, provided at said flange portion and forming a bolt insertion hole.

3. A shield connector structure according to claim 1, wherein said housing is conductive.

4. A shield connector structure according to claim 1, wherein said housing and said conductive shield member are formed integrally.

5. A shield connector structure according to claim 1, wherein said housing further includes a drain hole, provided adjacent to said first seal member.

6. A shield connector structure according to claim 1, further comprising a cushion member mounted on an insertion tip of shield electric wire with facing to said hole portion of said case.

7. A shield connector structure according to claim 1, wherein:
   one of said flange portion and said conductive shield member includes a projection, and
   the other of said flange portion and said conductive shield member includes an engaging portion.

8. A shield connector structure according to claim 7, wherein:
   said flange portion of said housing is provided with a bolt insertion hole;
   said conductive shield member is provided with a long hole corresponding to said bolt insertion hole of said flange portion, and
   said bolt insertion hole overlaps said long hole when said projection and said engaging portion are engaged with each other.

9. A shield connector structure according to claim 1, wherein said housing includes ring walls projecting from surfaces on opposite sides of said housing, wherein said ring walls are coaxial with said insertion hole.

10. A shield connector structure according to claim 9, further comprising a stopper holder fitted to said shield electric wire and to an upper portion of one of said ring walls of said housing.

11. A shield connector structure according to claim 9, wherein:

said conductive shield member comprises a first ring portion, a second ring portion, and a third ring portion, wherein said first, second, and third ring portions form three steps of decreasing diameter, an inner surface of said first ring portion is fitted to one of said ring walls of said housing, and an outer surface of said first ring portion contacts said hole portion of said case, an inner surface of said second ring portion is fitted to said second longitudinal portion of said first seal member, and an outer surface of said second ring portion is fitted to said inner periphery of said second seal member, and said wire shield portion of said shield electric wire connects to said third ring portion.

12. A shield connector structure according to claim 11, further comprising a shield sleeve including a cylindrical portion and a brim portion, wherein:

said wire shield portion of said shield electric wire is fastened and connected to said third ring portion of said conductive shield member by said cylindrical portion of said shield sleeve, and said brim portion extends radially from an end of said cylindrical portion, and is positioned proximate to and facing said second seal member.

13. A shield connector structure according to claim 9, wherein:

said conductive shield member includes a first ring portion and a second ring portion, wherein said first and second ring portions form two steps of decreasing diameter, said first longitudinal portion of said first seal member has a smaller outer diameter than said second longitudinal portion of said first seal member, an inner surface of said first ring portion is fitted to said second longitudinal portion of said first seal member and one of said ring walls of said housing, and an outer surface of said first ring portion contacts said inner periphery of said second seal member, said wire shield portion of said shield electric wire connects to said second ring portion.

14. A shield connector structure according to claim 13, wherein said second seal member is located at an end of said hole portion of said case.

15. A shield connector structure according to claim 13, further comprising a shield sleeve, wherein said wire shield portion of said shield electric wire is fastened and connected to said second ring portion of said conductive shield member by said shield sleeve.

* * * * *